Figure 1:
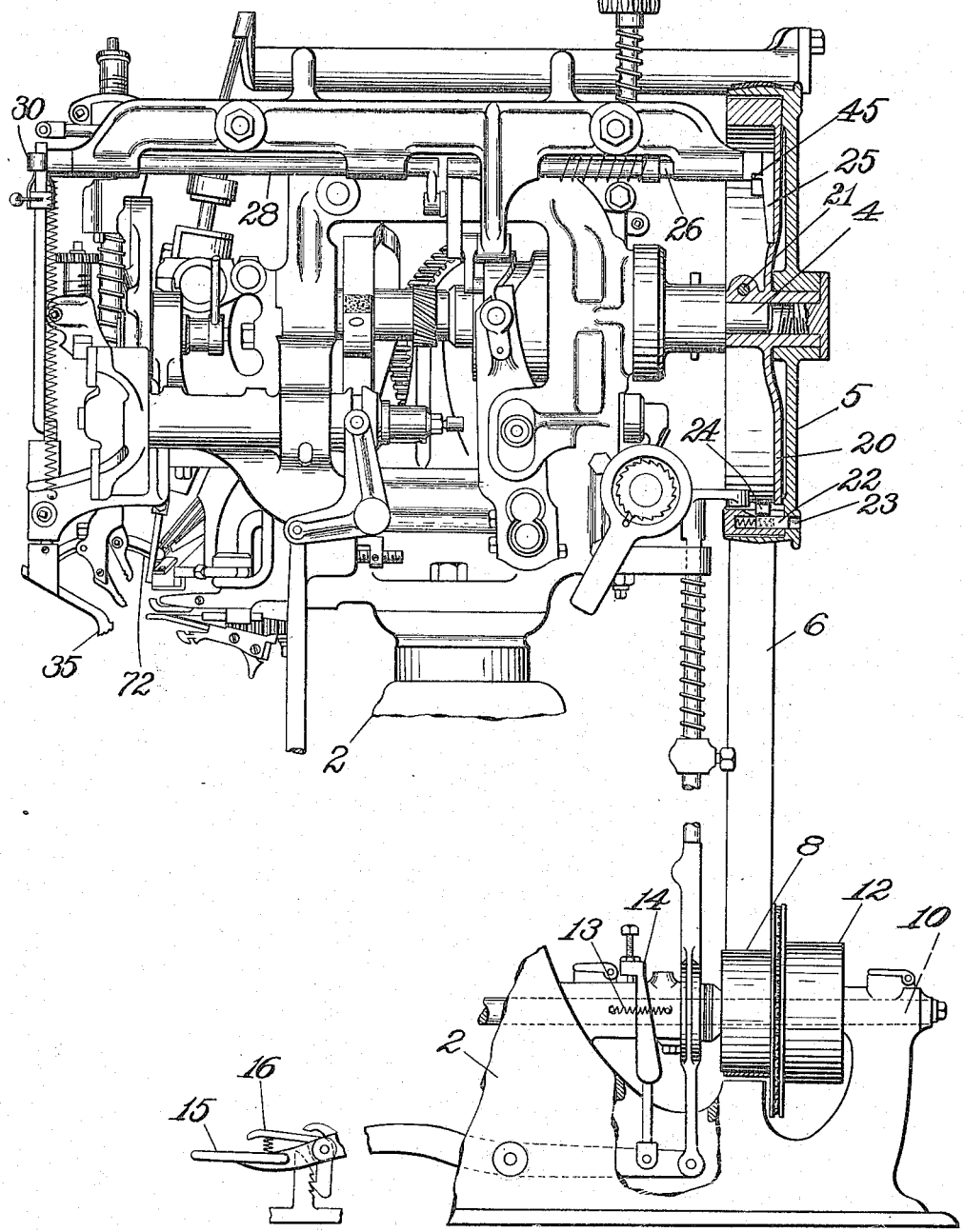

UNITED STATES PATENT OFFICE.

RALPH C. SIMMONS, OF BEVERLY, MASSACHUSETTS, ASSIGNOR TO UNITED SHOE MACHINERY COMPANY, OF PATERSON, NEW JERSEY, A CORPORATION OF NEW JERSEY.

LASTING-MACHINE.

1,129,047.          Specification of Letters Patent.      Patented Feb. 16, 1915.

Application filed December 21, 1908. Serial No. 468,575.

*To all whom it may concern:*

Be it known that I, RALPH C. SIMMONS, a citizen of the United States, residing at Beverly, in the county of Essex and Commonwealth of Massachusetts, have invented certain Improvements in Lasting-Machines, of which the following description, in connection with the accompanying drawings, is a specification, like reference characters on the drawings indicating like parts in the several figures.

This invention relates to machines for working an upper over a last and particularly to lasting machines.

The invention is herein shown as embodied in a lasting machine of the type fully shown and described in U. S. Letters Patent 584,744.

An object of the invention is to increase the efficiency of the machine and relieve the operator by providing means for automatically starting the machine when the work is presented and automatically stopping the machine when the work is withdrawn.

To this end an important feature of the invention consists in a device operatively connected with the starting and stopping mechanism and located in position to be engaged and shifted by the work when the latter is in place to be operated upon. As herein shown this device is so arranged that when the work is pressed against it, the device will be moved to cause the machine to be started and when the work is withdrawn or is shifted in position, said device will be reversely moved and cause the machine to be stopped.

A novel characteristic of the illustrated machine embodying this invention is that the controlling device above referred to is so arranged that the shoe may be presented and adjusted to the machine in position for the edge portion of the upper to extend into the machine grippers or into position to be engaged by a machine gripper without causing the machine to be started until the operator is in all respects ready to have the machine begin its operation. Also the controlling device may be caused to stop the machine without necessarily removing the work from the machine or from position to be operated upon. It sometimes happens that in the use of the machine driven at high speed an operator, particularly if he is not highly skilled, may find occasion to employ more time between successive operations of the grippers than the speed of machine provides and yet not desire to withdraw the shoe entirely from the machine for the purpose of stopping the machine. To this end the controlling device which is shown as arranged to engage yieldingly the bottom of the shoe may be permitted to descend or shift its position far enough to stop the machine without requiring the withdrawal of the shoe from working position. By reason of this characteristic of the preferred embodiment of the present invention the operator has the machine completely under control and by relieving the pressure of the shoe against the controlling device may at the end of any cycle stop the machine momentarily and then cause it to resume its operation. This gives him opportunity to make such adjustments of the shoe with relation to the operating devices between each cycle of the machine's operation as he may at any time see are needed.

Another important feature of this invention consists in power driven means for operating the starting and stopping mechanism which means is arranged to be set by the controlling device. This arrangement makes the controlling device more sensitive and easier to operate than would be the case if it were required to produce the operative movements of the starting and stopping mechanism, and this feature of this invention is applicable to the control of other mechanisms besides the starting and the stopping mechanisms.

A further feature of this invention consists in the combination with means controlled by the position of the work or otherwise for starting or stopping the machine at the end of a cycle of its operation of other means for stopping the machine.

The illustrated embodiment of this feature of the invention is characterized by the fact that the machine may be stopped at any desired point in the cycle of its operation and by the further fact that the speed of the machine may be reduced below the normal during any portion of a cycle or during the entire cycle. This feature of the invention is herein shown as embodied in a friction clutch connected with and controlling a counter-shaft from which the main shaft of the machine is driven, said clutch being itself controlled by a treadle which permits the clutch to be opened and closed at any time desired and also permits the clutch to be partially opened so that the friction members slip more or less whereby the speed at which the machine is driven will be varied.

Another feature of this invention comprises provision for disconnecting the above described controlling device from the starting and stopping mechanism and connecting it with means for starting and stopping the supply of tacks which are provided for fastening the upper after it has been pulled by the grippers but which in lasting the toe portions of certain kinds of shoes are not required in view of the fact that the upper, at the toes of said shoes, is usually fastened by a binder of continuous material which is wrapped about the toe portion of the shoe. In accordance with this feature of the invention the delivery of tacks may be suspended without interrupting the operation of the other devices of the machine. The illustrated embodiment of this feature of the invention also has the characteristic that the delivery of tacks may be suspended whenever the shoe is withdrawn from the machine notwithstanding the tack driver and other portions of the machine may be continued in operation. This prevents the waste of tacks by needlessly driving or expelling them from the tack holder when no shoe is in position to receive them in case the operator does not stop the machine when he withraws his shoe from position to be operated upon.

These and other features of the invention including certain combinations of parts and details of construction will appear more fully in connection with the following description of the illustrated embodiment of the invention and will be finally pointed out in the claims.

Figure 2:
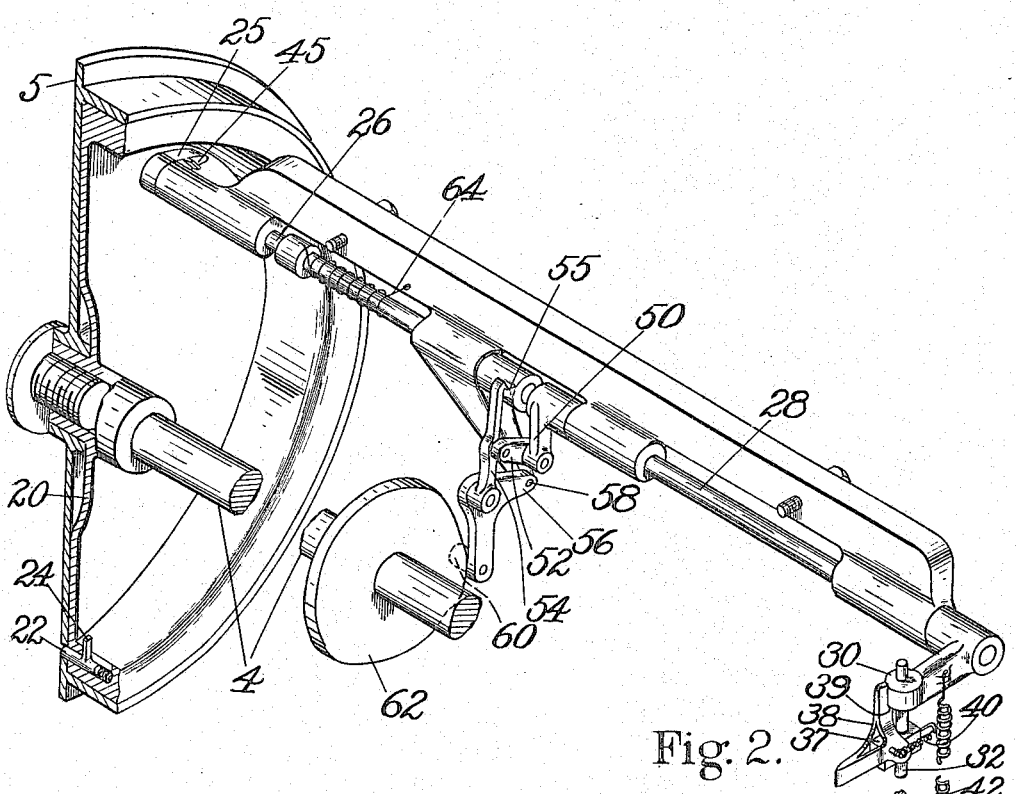
Figure 3:
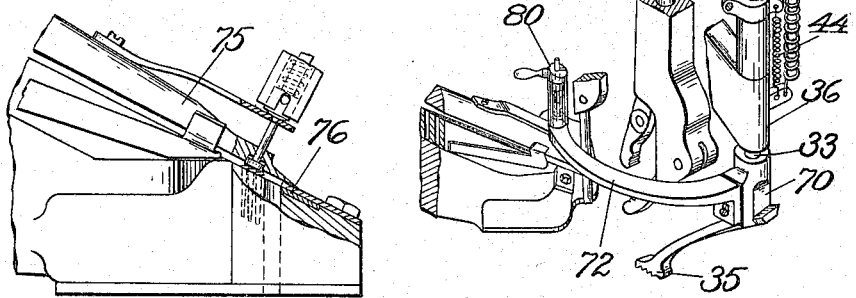
Figure 4:
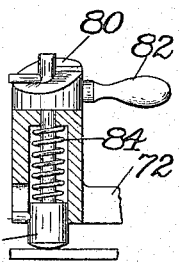

Figure 1 is a side elevation of a lasting machine equipped with the present invention, certain parts being shown in section. Fig. 2 is a perspective view of certain parts more directly concerned with this invention. Figs. 3 and 4 are details connected with the operation for stopping the delivery of tacks.

The head of the machine which is supported on a post 2 has bearings for a driving shaft 4 relatively to which turns loosely a pulley 5 connected by belt 6 with a loose pulley 8 on a counter-shaft 10 driven from a suitable source of power through a fast pulley 12. The loose pulley 8 is normally held by spring 13 away from the fast pulley 12 while a wedge 14 connected to a treadle 15 is adapted for movement to force the loose pulley into contact with a friction disk carried by the fast pulley. The driving shaft 4 has a driving connection with a disk 20 which is partially inclosed by the loose pulley and this driving shaft has also connection with numerous cams and other devices through which the grippers, tack-feeding mechanism and other instrumentalities of the machine are actuated in proper time and relation. The construction, relative arrangement and operation of these several devices is fully explained in said prior patent to which reference may be had for specific information about the lasting devices. One revolution of the shaft 4 effects a complete cycle of operation of the machine. The disk 20 carries a spring pressed pin 22 which is adapted to engage with a recess 23 in the pulley 5 whereby said disk, shaft and parts connected therewith are driven. The clutch pin 22 has a shoulder 24 and a wedge 25 is arranged to be moved into and out of the path of this shoulder for retracting the clutch pin to disconnect the disk 20 from the pulley and for releasing the clutch pin to permit it to connect the disk with the pulley when the machine is to be started. The clutch wedge is carried by a rockshaft 26 connected through devices hereinafter to be explained with a rockshaft 28 which has an arm 30 through which extends loosely a rod 32, the lower end of which is detachably connected to a second rod 33. The controlling device 35 which is herein shown, is in the form of the usual bottom-rest of the lasting machine and is carried by the lower end of the rod 33 which is guided through a portion 36 of the machine head as indicated in Fig. 2. The rod 32 carries a block 37 upon which is mounted a pivoted finger 38 having a shoulder at 39 to engage under the arm 30 for causing that arm to be lifted and the rockshaft 28 turned when the controlling device 35 forces the rod 32 upwardly. A light spring 40 holds the finger normally in proper position to engage and operate the arm 30. A spring 42 connects the arm 30 with the portion 36 of the machine head for reversely turning the arm at its shaft. A light spring 44 connects said part 36 of the machine head with a collar on the rod 33 for holding said rod and the controller normally in their lowest position. This arrangement is such that withdrawal of the work from the bottom rest or controlling device 35 will permit the spring 42 to turn the rockshaft 28 in the direction for throwing the wedge 25 into the path of the shoulder 24 on the clutch bolt 22. Whenever this has been done the wedge will withdraw the clutch bolt disconnecting the driving shaft from the driven pulley 5 and permit the lasting and tacking devices to come to rest. The wedge is so formed with a shoulder at 45 that it insures the stopping of the machine with the several parts at a predetermined point from their cycle of movement.

The controlling device is arranged to set devices through which the starting and stopping mechanism including the wedge 25 and the clutch bolt 22 are operated. To this end, as herein shown, the rockshaft 28 has an arm 50 which is connected by link 52 with a pawl 54 adapted to engage with a shoulder or short arm 55 on the rockshaft 26. The controlling device 35 thus acts through the rockshaft 28 to position the pawl 54 connecting or disconnecting it with the rockshaft 26. The pawl 54 is connected to a lever 56 which is fulcrumed at 58 to a thick bar of the machine head and has at its opposite end a roll 60 which rests upon a cam disk 62 fast on the driving shaft 4. This cam disk operates while the machine is in motion to oscillate the lever 56 and reciprocate the pawl 54 idly up and down so long as the pawl is held away from the arm 55 by the upward pressure of the work against the controlling device 35. When, however, the work is withdrawn from the controlling device 35, or the pressure of the work against that device is relieved sufficiently to permit the spring 42 to turn the rockshaft 28, the pawl 54 will be moved into position to engage the arm 55 and pull that arm downwardly by the movement which it receives from cam 62. The cam 62, therefore, through power derived from the moving shaft 4, will effect the shifting of the wedge 25 and the stopping of the machine. A spring 64 upon the shaft 26 normally holds the wedge away from a position to engage shoulder 24 on the clutch pin. The finger 38 extends above the shoulder 39 and its end face is adapted to be positioned under the arm 30 to hold that arm and therefore the pawl 54 in such a position that the pawl cannot engage the arm 55 of rockshaft 26 even when a shoe is pressed against the controller 35 and that device is lifted to the extent of its movement. This provides for rendering the controlling device inoperative for starting and stopping the machine while permitting that device to serve its other and constant function of a bottom rest for the shoe being lasted. The finger 38 has a laterally projecting arm by which it can be manipulated by the operator and if desired, can be moved to start the machine independently of the controlling device 35.

The controlling device is connected to the rod 33 by a block 70 from which projects laterally a curved arm 72 having a bearing for an upright spring-pressed plunger 74 which extends through the race-way cover 75 into position to rest upon the heads of the nails in the race-way, which are just above the tack separating plate 76 and hold these nails from movement into the path of that plate and therefore hold them from being fed or delivered. The construction is shown most clearly in Figs. 2, 3 and 4. This arrangement is such that when the controlling device 35 is lifted by the work the plunger 74 is lifted from the tacks in the race-way and the feeding of nails proceeds with each operation of the machine. When, however, the work is withdrawn the controlling device descends by reason of the spring 44 and the plunger engages the nails and stops their delivery. This control of the nail-feeding mechanism may be employed when the upper end of the finger 38 has been adjusted under the arm 30 to hold the pawl 54 away from the arm 55 and thus break or interrupt the operative connection between the controlling device and starting and stopping mechanism.

The plunger 74 has a laterally projecting pin in its upper end which rests upon a rotatable wedge 80 having a handle 82. This wedge controls the vertical position of the plunger and it may be adjusted as shown in Fig. 4 to permit the spring 84 which acts on the plunger to hold the latter down upon the tacks and prevent their progress into the path of the tack separating blade in all positions of the controlling device 35. This arrangement is useful when a portion of the shoe—as for example the toe portion of a welt shoe is being lasted and fastened by a binding of wire instead of being fastened by tacks. In the use of the machine the treadle 15 may be depressed and locked by the ratchet plate 16 with the fast and loose pulleys 8 and 12 in driving contact so that the pulley 5 will be continuously driven. With the parts adjusted as shown in Fig. 2, the machine will then be started and stopped by the controlling device 35. It will be observed that said device is so constructed and arranged that the operator has entire freedom to position and adjust the shoe in the machine and with relation to the grippers and other devices which operate upon it without starting the machine. The spring 42 holds the controlling device 35 down with sufficient force to permit the operator, if he so desires, to rest the shoe lightly against the controlling device while he is so adjusting the shoe and placing the upper in position to be seized and pulled by the gripper. The machine is then started by an upward pressure against the controlling device sufficient to overcome the tension of the spring 42 and turn the pawl 54 away from the arm 55. This releases the rockshaft 26 which is thus turned automatically by the spring 64 to withdraw the wedge 25 from the clutch bolt and permit that bolt to engage in the recess 23 of the continuously moving pulley 20. The machine is thus started and will continue in operation as long as the operator holds the shoe against the controlling device or bottom rest provided the treadle 15 remains depressed. If, however, the shoe or a particular portion of the shoe being lasted requires careful, slow pulling, the operator may disengage the treadle from its ratchet and by holding the clutch members 8 and 12 in light engagement cause the machine to be slowly turned through any given cycle of the machine's operation or through successive cycles. The operator may also release the treadle 15 sufficiently to stop entirely the machine at any desired point in its cycle of operation.

When the shoe is withdrawn from the machine the controlling device is permitted to move downwardly and to swing the pawl 54 into position to engage the arm 55 whereupon the cam 62 acting through the lever 56 and said pawl turns the rockshaft 26 for stopping the machine. The machine, of course, stops with that portion of the cam 62 against the lever 56 which is effective for pulling down the pawl. If, during the lasting operation, the workman desires to have a longer interval between the upper pulling movements than the speed of the machine provides, he can, by relieving the pressure upon the controlling device, at the end of each operation, or at the end of any given cycle of operation, cause the clutch bolt 22 to be retracted and the machine stopped until the pressure on the controlling device shall have been renewed whereupon the machine will be restarted. The operator can thus run the machine as slowly as he may desire by the use of the controlling device. It is to be understood, however, that in so doing each cycle of the machine's operation is performed at the normal speed and the operator varies the intervals between the cycles. If it is desired that the machine shall move slowly through its cycle, the treadle 15 will be employed, as above described. If it is desired to stop the delivery of tacks while the controlling device 35 is also employed for starting and stopping the machine, the wedge 80 will be adjusted, as shown in Fig. 4, to prevent the progress of the tacks down the race-way while, for example, the toe of the shoe is being fastened by wire. If the controlling device 35 for any reason is not to be employed for starting and stopping the machine the finger 36 may be adjusted to position its upper end under the arm 30 and thus maintain pawl 54 out of engagement with the arm 55. When this adjustment has been made the feeding of tacks may be controlled by the plunger 74 as described, the tacks being stopped whenever the work is withdrawn from the controlling device notwithstanding the moving parts of the machine continue in operation. When the tack controlling device is so used the wedge 80 will, of course, be turned to put a high portion under the laterally projecting pin on the plunger 74.

It will be understood from the foregoing explanation that in the illustrated embodiment of the invention the same controlling device is or may be operated both for starting and stopping the machine as a whole and for clamping the tacks into the race-way to prevent their movement and releasing them to permit them to be fed. It will be understood that said device may also be used for controlling independently either the starting and stopping mechanism or the tack-feeding. This is a material advantage in that the same device may be used for performing either or both of the two functions.

Provision is made for varying the point in the rotation of the cam shaft 4 at which the automatic stopping of the machine can be effected, for example with the grippers more or less open or more or less near their gripping positions. This provision consists, in the machine shown, in a shiftable connection between the cam shaft 4 and the disk 20 formed by the split clamp on the hub of the disk which is adapted to be locked by the bolt 21 in any relative angular position of the shaft and disk.

Having explained the nature of this invention and described the preferred construction embodying the same, I claim as new and desire to secure by Letters Patent of the United States:—

1. A machine of the class described, having, in combination, means for operating on the work, power driving mechanism therefor, and a starting and stopping mechanism including a controlling device arranged to be engaged and moved by the work and having connections with said driving mechanism which are arranged to cause it to drive said means continuously through repeated cycles of the machine while the work is maintained in uniform engagement with said controlling device, said connections including an element arranged for convenient adjustment to render the starting and stopping mechanism unresponsive to the movement of the controlling device.

2. A machine of the class described, having, in combination, means for working an upper over a last, power driving mechanism therefor, and starting and stopping mechanism including a device located to permit the shoe to be rested against it in positioning the upper for the operation of the overworking means, said resting device being movably mounted and connected to the starting and stopping mechanism for causing the latter mechanism to start the machine in response to pressure of the work against said device and to continue the starting mechanism in operative condition as long as uniform pressure is maintained.

3. A machine of the class described having in combination a starting and stopping mechanism, operating means therefor, including a pawl arranged to be continuously actuated while the machine is running, and a device arranged to be controlled by the position of the work for shifting said continuously moving pawl into and out of position for actuating the starting and stopping mechanism.

4. A machine of the class described having in combination starting and stopping mechanism, a controlling device therefor arranged normally to cause the machine to be stopped when the work is withdrawn from position to be operated upon by the machine, and connections between said device and said mechanism adapted to be adjusted to prevent the machine being stopped by the withdrawal of the work.

5. A machine of the class described having in combination starting and stopping mechanism arranged to stop the machine at a single point in the cycle of its driver, and a controlling device adapted to be shifted by the work for causing the operation of the starting and stopping mechanism and adapted to be manipulated for causing the machine to skip one or more cycles while the work remains in the machine.

6. A machine of the class described having in combination starting and stopping mechanism controlled both as to initiation and discontinuance of operation of the machine by the position of the stock in the machine, and independent means located between said mechanism and the stock for continuing the machine in operation without reference to the position of the stock.

7. A machine of the class described organized for continuous operation having in combination starting and stopping mechanism controlled by the position of the stock in the machine, and independent means comprised within the machine and responsive to the control of the machine operator for varying the speed at which the machine is running.

8. A machine of the class described having in combination starting and stopping mechanism arranged to start the machine at a predetermined point in its cycle of operation, means controlled by the position of the work for causing the operation of the starting and stopping mechanism, and other means under control of the operator for causing the machine to be started or stopped at any desired point in its cycle of operation.

9. A machine of the class described having in combination a starting and stopping mechanism, and a device controlled by the position of the work for causing the operation of said starting and stopping mechanism to initiate, to continue indefinitely, and to stop the machine, said machine comprising within its mechanism means for permitting the operator to stop the machine independently of said device.

10. A machine of the class described organized for continuous operation having means for operating upon a shoe, actuating mechanism therefor, means independent of said operating means for resting the shoe preparatory to and during the operations thereon, and connections between said rest and the actuating mechanism whereby the machine may be started and stopped by variations in the pressure of the work against the rest, said connections including means adapted for adjustment to render the machine unresponsive to variations in pressure of the work.

11. A machine of the class described having in combination means for feeding and driving tacks, starting and stopping mechanism, a device controlled by the position of the work for causing the operation of said starting and stopping mechanism, and connections between said device and the tack-feeding mechanism for controlling the operation of said feeding mechanism, said connections including means adapted for adjustment to govern the feeding mechanism independently of said device which is controlled by the position of the work.

12. A machine of the class described having in combination means for feeding and driving tacks, starting and stopping mechanism, a device controlled by the position of the work for causing the operation of said starting and stopping mechanism, and connections between said device and the tack-feeding mechanism adapted to be adjusted to determine whether or not the feeding of tacks shall be started when the machine is started.

13. A machine of the class described having in combination means for feeding and driving tacks, starting and stopping mechanism, and a device controlled by the position of the work for causing the operation of said starting and stopping mechanism, said machine having provision for starting and stopping the tack feeding operation without interrupting the operation of the machine as a whole.

14. A machine of the class described having in combination means for feeding and driving tacks, starting and stopping mechanism, and a device controlled by the position of the work for causing the operation of said starting and stopping mechanism, said machine having provision for disconnecting the controlling device from the starting and stopping mechanism and causing said device to start and stop the delivery of tacks according to the position of the work.

15. A machine of the class described having in combination devices for operating on a shoe including means for feeding and driving tacks, and means controlled by the position of the shoe for starting and suspending the operation of the machine, said last-mentioned means having provision for adjustment for suspending the delivery of tacks independently of the positions of the shoe.

16. A machine of the class described having in combination means for feeding and driving tacks, controlling mechanism therefor arranged to be actuated by the work, said controlling means comprising a device for arresting the feeding movement of the tacks, and means for adjusting said device to prevent the feeding of the tacks in any position of the controlling means.

17. A lasting machine having in combination means for working an upper over a last, actuating means therefor, and means controlled by the position of the work for automatically stopping the machine, said machine having provision for varying definitely the point at which the stopping shall take place.

18. A lasting machine having in combination means for working an upper over a last, actuating means therefor, and means including the clutch pin disk 20 adjustably connected with the cam shaft, the clutch pin and the shoe bottom rest being operatively connected with the clutch pin for stopping the overworking means after withdrawal of the work with said means in a position determined by the adjustment of said disk.

19. A machine of the class described having in combination mechanism for inserting tacks including tack feeding means, mechanism for actuating said feeding means, and mechanism controlled by the position of the work to stop automatically the movement of the tack feeding means having provision for adjustment to vary the point in its movement at which the feeding means shall be stopped.

In testimony whereof I have signed my name to this specification in the presence of two subscribing witnesses.

RALPH C. SIMMONS.

Witnesses:
 CHESTER E. ROGERS,
 DANIEL J. MANNING.

Copies of this patent may be obtained for five cents each, by addressing the "Commissioner of Patents, Washington, D. C."